AUTOMATIC FREQUENCY CONTROL SYSTEM WITH LOCAL OSCILLATOR CONTROLLED BY SWEEP SEARCH GENERATOR

Filed June 15, 1954

INVENTOR

WILLIAM E. MORGAN, JR.

BY

R. V. Craddock

ATTORNEY

United States Patent Office 3,174,105
Patented Mar. 16, 1965

3,174,105
AUTOMATIC FREQUENCY CONTROL SYSTEM WITH LOCAL OSCILLATOR CONTROLLED BY SWEEP SEARCH GENERATOR

William E. Morgan, Jr., Levittown, N.Y., assignor to Sperry Rand Corporation, a corporation of Delaware
Filed June 15, 1954, Ser. No. 436,794
8 Claims. (Cl. 325—420)

This invention relates to automatic frequency control systems. It is particularly concerned with apparatus for automatically maintaining the frequency of a high frequency continuous-wave local oscillator at a predetermined and constant frequency difference from the carrier frequency of a series of radar pulses.

The present application is a continuation-in-part of application No. 307,197, filed on August 30, 1952 in the name of William E. Morgan, Jr., now Patent No. 3,021,424.

One prior type of automatic frequency control system comprises a discriminator, a search stopper, and a slow-sweep search generator for controlling the frequency of a local oscillator. Such a system is described in Sec. 7–10 of the book entitled "Microwave Mixers," Volume 16 of the M.I.T. Radiation Laboratory Series, published by McGraw-Hill in 1948. In the aforementioned system a discriminator produces an error signal voltage output of varying intensity and polarity in response to input energy containing frequency components within intermediate frequency sidebands on both sides of the carrier frequency of a radar transmitter. The response during passage through one sideband is the mirror image of the response during passage on through the other sideband, as is seen in FIG. 7–17 of the aforementioned textbook. When a signal having a predetermined polarity appears in the discriminator output circuit, it controls the search stopper to arrest the voltage sweep of the search generator. The frequency search of the local oscillator is also arrested since the local oscillator frequency is controlled by a voltage derived from the search generator. Therefore, the local oscillator is held or locked at a frequency which, when heterodyned with the carrier frequency of the radar transmitter, results in maintenance of a required intermediate frequency during one or the other discriminator sideband responses.

Locking during both discriminator sideband frequency responses is undesirable where locking on one sideband occurs at a different value of the intermediate frequency from that resulting when the system locks on the opposite sideband, a disadvantage of the above-described circuit. Furthermore, the aforedescribed system is unsatisfactory for use in some monopulse radar systems wherein locking during the wrong side band frequency response would cause the system to generate error signals of the wrong polarity for correct tracking.

It is an object of this invention to provide a system for locking a local oscillator, which is controlled in frequency by a slow sweep search generator, to a frequency which is at a predetermined and constant difference from the carrier frequency of a series of radar pulses transmitted in a radar system.

It is a further object of this invention to provide that the local oscillator becomes positively locked at only one of the two usually possible lock-on frequencies, and that a predetermined difference between the frequency of the local oscillator and the carrier frequency of the radar pulses is positively maintained regardless of changes in temperature, supply voltage, or other factors that influence the operating frequency of the radar transmitter or local oscillator.

Still another object of this invention is to insure, if for some reason the system is unlocked or searches beyond the desired frequency response range toward the undesired frequency response range, that the system will automatically reject the undesired response and continue to search to a point in the search cycle at which the proper lock-on will be effected.

The foregoing objects are met by providing an automatic frequency control system which includes a discriminator network, a control channel, a relay and two relay control circuits.

The control channel includes a selective coupling means, which is regulated by the relay, and a search stopper control circuit. A slow sweep search generator is employed to continuously change or scan the frequency of a high frequency local oscillator over a wide frequency range, said range including the carrier frequency of a series of transmitted radar pulses. Upon completion of the control channel circuit by the selective coupling means and operation of the search stopper control circuit by a voltage of a predetermined polarity derived from the discriminator network, the sweep of the search generator is arrested to maintain the local oscillator frequency at a point where the difference between the frequency of the local oscillator and the carrier frequency of the radar pulses is at a desired value.

The relay and control circuits therefor are employed to insure that the selective coupling means is properly actuated to complete the aforementioned control channel circuit only during a discriminator sideband frequency response and only when the voltage output from the discriminator network is initially at a polarity opposite the aforesaid predetermined polarity, and thereafter for a substantially uninterrupted discriminator response regardless of polarity.

The system of the present invention comprises an improvement over the system of the invention disclosed in the aforementioned application No. 307,197 because of a reduction in the overall number of circuit components in the relay control circuits thereof.

The foregoing and other features and advantages of the present invention will become apparent to those skilled in the art from the detailed description thereof taken in connection with the accompanying drawings in which.

Figure 1:
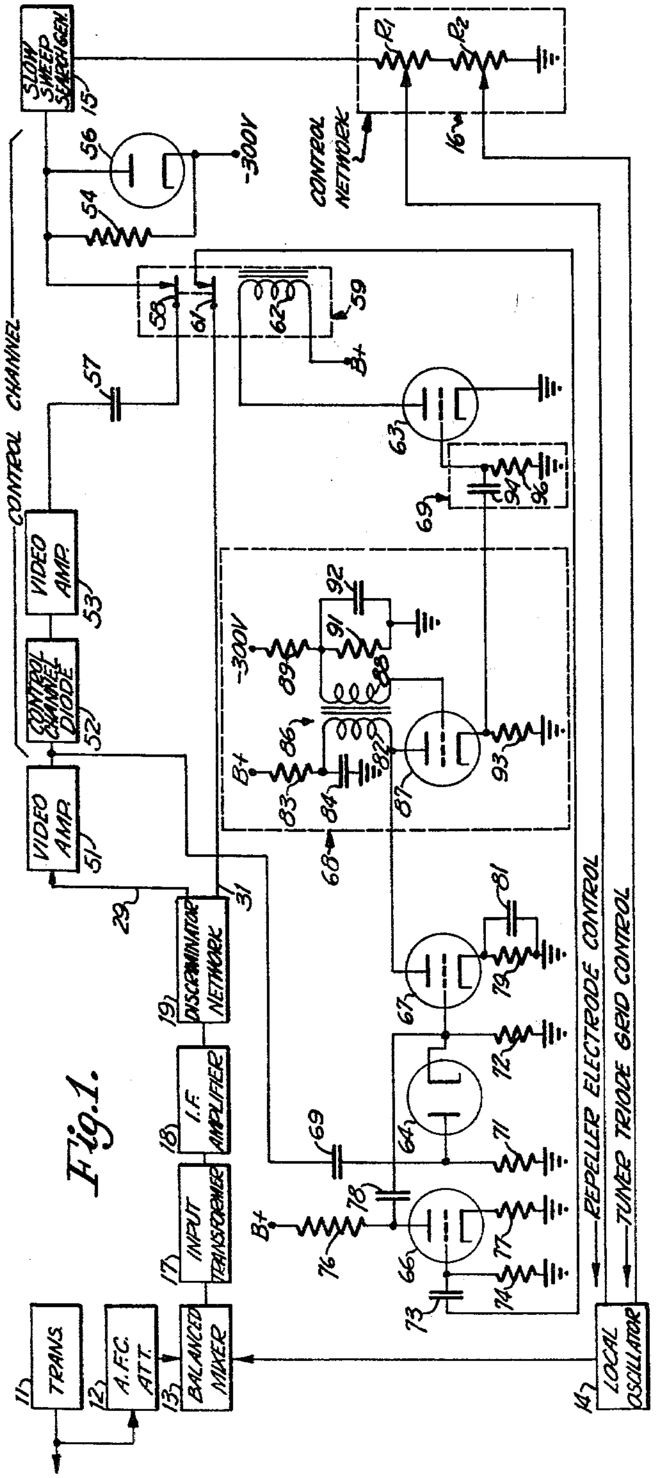
FIG. 1 is a schematic diagram of a portion of a pulse radar system embodying the present invention.

Referring to FIG. 1, a transmitter 11 produces recurrent pulses of microwave energy having a predetermined duration and a predetermined repetition rate. A version of the output of transmitter 11 is passed through a variable attenuator 12 and applied to a balanced crystal mixer 13. Continuous-wave energy from a local oscillator 14 is also applied to the aforementioned mixer 13, which preferably comprises a wave guide hybrid tee having a detector therein.

Local oscillator 14 comprises a thermally tuned 2K50 reflex klystron of the type shown on page 293 of the aforementioned book entitled "Microwave Mixers," and is controlled in output frequency by negative voltage derived from the plate of a slow sweep search generator 15. Search generator 15 comprises an oscillator of the type shown and described in Sec. 7–13 of the aforementioned textbook, starting on page 326, for example, and is sometimes referred to as a transitron or a phantastron.

In the present arrangement, generator 15 is adapted to produce a sawtooth voltage waveform in its plate circuit which is substantially identical with that shown in the uppermost diagram in FIG. 7.24 of the above-mentioned textbook, except that the useful search voltage is made negative with respect to ground. The aforementioned search or control voltage must be negative to regulate the tuning of the klystron local oscillator 14. This is done through a control network 16 comprising resistors $R_1$ and $R_2$. A negative voltage derived from network 16 is applied to the repeller electrode of oscillator 14 and a negative bias voltage derived from network 16 is applied to the grid of the tuner triode in the 2K50 reflex klystron oscillator 14 for regulating the tuning of the oscillator.

The gradual sawtooth sweep of the plate voltage of search generator 15 causes the frequency of local oscillator 14 to vary from below to above the microwave carrier frequency of transmitter 11, which carrier frequency may be of the order of 24,000 megacycles per second for example. At the end of the sweep cycle of the search generator 15, the plate voltage thereof is abruptly returned to its original value to start the tuning cycle over again. In one system embodying the present invention, about 45 seconds are required for the sweep generator to proceed through one sweep cycle, the frequency transversal range of the local oscillator being of the order of 1000 megacycles per second.

The signals derived from the output of mixer 13 are in the form of wave-trains or pulses containing energy components at the difference frequency between the carrier frequency of the radar pulses from transmitter 11 and the high frequency energy from local oscillator 14. These pulses of intermediate frequency energy are fed into a balanced-to-unbalanced transformer 17 which may be of the type shown in FIGS. 6–13 and described on pages 271–274 of the aforementioned book entitled "Microwave Mixers," for example. The output of transformer 17 is connected to the input grid of a conventional broad-band, self-biased intermediate frequency amplifier 18.

Figure 2:
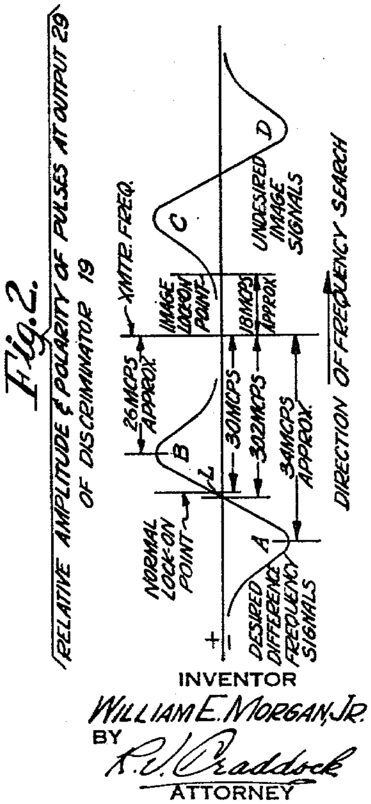
FIG. 2 illustrates graphically the amplitude envelope and polarity of pulses obtained at a first output of the discriminator network utilized in conjunction with the present invention.
Figure 3:
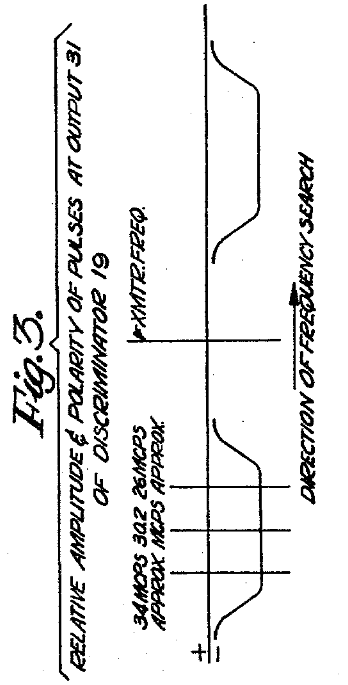
FIG. 3 illustrates graphically the amplitude envelope and polarity of pulses obtained at a second output of the discriminator network utilized in conjunction with the present invention.

The amplified pulses of intermediate frequency energy from amplifier 18 are applied to a discriminator network 19. Discriminator network 19 is similar to the discriminator network designated by the same reference numeral and described in the aforementioned copending application No. 307,197, for example. The network 19 receives amplified pulses of intermediate frequency energy during local oscillator scanning, and provides a predetermined waveform of output pulses at a first output 29 having a relative amplitude envelope and polarity over predetermined intermediate frequency ranges as illustrated in FIG. 2, while simultaneously providing a predtermined waveform of output pulses at a second output 31 having a relative amplitude envelope and polarity over the same intermediate frequency ranges as indicated in FIG. 3. The first output 29 and the second output 31 comprise first and second outputs, respectively, of intermediate frequency energy responsive means comprising transformer 17, I.F. amplifier 18 and discriminator network 19. In one system embodying the present invention the discriminator crossover frequency is of the order of 30.2 megacycles per second, for example.

The output pulses provided by discriminator network 19 via output lead 29 are fed into a video amplifier 51, which is a self-biased triode for example. The output of amplifier 51 is fed into an input diode 52 of a search stopper "control channel" for arresting and regulating the scanning voltage of search generator 15 at a proper value to control the frequency of oscillator 14 so that a predetermined value of intermediate frequency can be maintained at 30 megacycles per second, for example.

The "control channel" further includes a self-biased pentode video amplifier 53, for example, which is coupled to the output of diode 52, and a parallel connected resistor 54 and diode 56 coupled to the output of amplifier 53 through a capacitor 57. The output from across resistor 54 and diode 56 is supplied to the grid of search generator 15.

An armature switch means 58 of a relay 59 is also included in the aforementioned "control channel" to provide selective coupling, i.e., coupling or decoupling between the output 29 of the discriminator network 19 and the input to search generator 15. The relay 59 controls the position of armature switch member 58, and the position of a further switch member 61 ganged thereto. The positions of switch members 58 and 61 are regulated in accordance with whether a relay coil 62 thereof is conducting current or not. The ganged switch members 58 and 61 are held actuated to normally closed positions by conventional means such as a spring, not shown.

A relay control tube comprising a conventional triode 63 is provided to control the flow of current through coil 62 of relay 59. During operation of the system disclosed herein, the plate of tube 63 is coupled to a B+ power supply through coil 62 to cause tube 63 to become conducting. In the absence of negative bias at the grid of tube 63 a sufficient amount of current flows through the tube 63 and the coil 62 to produce a magnetic field about coil 62 which actuates armature switch member 58 to open or break the circuit between the output 29 of discriminator 19 and the input to the search generator 15. Since switch member 61 is ganged to member 58 it also opens or breaks the circuit in which it is located. Thus, when tube 63 is conducting, the output of discriminator network 19 can have no effect on the frequency search or scanning of local oscillator 14 by search generator 15.

The control channel diode 52 is connected to pass negative pulses only from video amplifier 51, which pulse energy is derived from positive pulses at the output 29 of discriminator network 19. These negative pulses are inverted and amplified in amplifier 53. If armature switch member 58 is closed, positive pulses from video amplifier 53 pass through condenser 57 to cause diode 56 to conduct, charging condenser 57 through the diode 56. After each pulse, the voltage on the plate of diode 56 becomes more negative than the voltage on the cathode, and condenser 57 discharges gradually through resistor 54, which has a large resistance value. At the end of each pulse, as the plate voltage of diode 56 becomes more negative, the grid of search generator 15 is carried with it in a negative direction. The increasing negative potential on the grid of search generator causes its anode potential to rise, and prevents generator 15 from continuing to generate oscillations in its output circuit, the generator 15 then acting as a normal D.-C. amplifier. The voltage produced at the output of generator 15 as an amplifier is regulated by the value of negative voltage applied to its grid so that the frequency of the local oscillator 14 will become locked to the required value to provide a desired intermediate frequency.

In the aforedescribed system approximately a 10 volt amplitude of the recurrent pulses is required to overcome the bias on the grid of generator 15 on search and cause locking. The circuit and theory of operation of such a device is more completely described in Sec. 7.13 of the "Microwave Mixer" book cited above.

Before the local oscillator frequency can be locked, it must be insured that the armature switch member 58 is actuated to be closed at a proper time during the search cycle. At the time the system is turned on for operation, however, the switch member 58 is open due to the fact that tube 63 and coil 62 are conducting current as was described above.

A first relay control circuit beginning with diode 64 is provided to close the switch members 58 and 61 and at a proper time during the output from discriminator 19. A second relay control circuit beginning with a triode 66 is provided to maintain the switch members 58 and 61 closed for a substantially uninterrupted discriminator response thereafter. A trigger tube 67, a blocking oscillator circuit 68 and a resistor-capacitor coupling circuit 69 comprise a common part of the aforementioned first and second relay control circuits.

The plate of diode 64 of the first relay control circuit is coupled to amplifier 51 at the first output 29 of discriminator network 19 through a coupling network comprising series capacitor 69 and shunt resistor 71. The cathode of diode 64 is coupled to the grid of amplifier 67 by a conventional shunt coupling resistor 72.

The grid of triode 66 of the second relay control circuit is coupled to the second output 31 of discriminator network 19 through switch member 61 (when closed) and a conventional coupling network comprising series capacitor 73 and shunt resistor 74. The plate of triode 66 is coupled to a B+ source of supply potential through a resistor 76, the cathode thereof being coupled to ground through a resistor 77 for biasing purposes. The output of triode 66 is coupled to the junction of resistor 72 and the grid of trigger tube 67 through a coupling capacitor 78.

The cathode of trigger tube 67, which is a conventional triode pulse amplifier, for example, is coupled to ground through a conventional cathode biasing network comprising resistor 79 and a shunt capacitor 81. The plate of tube 67 is coupled to a B+ source of supply potential through an inductance coil 82 and a resistor 83. The junction between resistor 83 and coil 82 is shunted to ground by a capacitor 84.

The coil 82 comprises the input coil of a one to one iron core pulse transformer 86 of the blocking oscillator 68. This oscillator also includes a triode 87 having its plate connected to the junction terminal of coil 82 and the plate of trigger tube 67. The grid of triode 81 is coupled back to its plate through a secondary coil 88 of transformer 86.

The potential on the grid of tube 87 is maintained well below cut-off by connecting the upper terminal of coil 88 to a voltage divider comprising resistor 89 and resistor 91. These resistors are connected to a negative source of D.-C. potential as illustrated. A capacitor 92 is connected across the terminals of resistor 91 for reasons which will become more clear below.

A resistor 93 is coupled between ground and the cathode of tube 87 for developing positive video pulse voltages thereacross when tube 87 is made conducting. The output from this resistor 93 is coupled to the circuit 69 comprising a series capacitor 94 and a large shunt resistor 96. The junction of capacitor 94 and resistor 96 is coupled to the grid of the relay control tube 63.

Ordinarily, the direction of frequency search of the local oscillator 14 is from frequencies appreciably lower than the carrier frequency of pulses produced by transmitter 11 to frequencies higher than said carrier frequency. The amplitude envelope of the difference frequency signals at the output 29 of discriminator network 19 are shown at the left of the intermediate line indicating the transmitter frequency in FIG. 2, and are designated "desired difference frequency signals." The difference frequency signals at the right of the aforementioned line in FIG. 2 are designated "undesired image signals." The latter must be prevented from having any effect on the search oscillator so that lock-on will only occur in region B of FIG. 2 in the vicinity of point L therein.

During scanning of the local oscillator 14 the tube 63 is conducting to maintain switch members 58 and 61 in an open condition as described above. When the output pulses on lead 29 of discriminator 19 are negative in region A of FIG. 2, the resulting output pulses from video amplifier 51 are positive. Each positive pulse causes the diode 64 to conduct so that each pulse is applied to the grid of trigger tube 67.

The windings or coils 82 and 88 of transformer 86 are connected so that a voltage induced across the secondary coil 88 by a current change in the primary coil 82 is of opposite polarity with respect to ground than the voltage produced across primary coil 82 with respect to ground. A positive pulse at the grid of tube 67 causes an increase in current flow through tube 67 and coil 82, and a drop in the voltage at the lower terminal of coil 82 nearest the plates of tubes 67 and 87. The resulting induced voltage in the secondary coil 88 is of such polarity that the voltage at the lower terminal of coil 88 nearest the grid of tube 87 is driven in a positive direction.

The induced voltage in the secondary coil 88 opposes the regular negative bias for the grid of tube 87 derived from the voltage divider comprising resistors 89 and 91 to raise the grid potential of tube 87 above cut-off. Plate current begins to flow in tube 87 to further increase the current flowing through coil 82 and to further increase the voltage induced in secondary coil 88. The voltage at the grid terminal of coil 88 therefore, is driven more and more in a positive direction while the plate potential of tube 87 becomes less and less.

After a short period of time has elapsed between the beginning of a positive pulse at the grid of tube 67, the grid of tube 87 becomes positive with respect to its cathode causing grid current to flow through tube 87 to thereby increase the negative charge on capacitor 92. Note that capacitor 92 is originally charged negatively by the negative D.C. voltage supply coupled to the voltage dividers comprising resistors 89 and 91. A state of equilibrium is reached wherein the current flow through tube 87 will not further increase and the grid voltage of the tube 87 becomes constant.

When the negative charge on capacitor 92 is increased by grid current flow in tube 87 by an amount such that the grid potential of tube 87 is decreased more rapidly than it can be increased by transformer 86, the plate current in tube 87 begins to drop. This causes the induced voltage in the secondary of transformer 86 to be of opposite polarity so that the grid of tube 87 is driven in a negative direction toward cut-off. Grid current in tube 87 stops flowing, and the voltage at the grid of tube 87 proceeds to go well below cut-off. The tube 87 remains cut-off until the next positive pulse is received at its grid, even though the charge placed upon capacitor 92 as a result of grid current flow is substantially dissipated between pulses. This is evident because the capacitor 92 will still be negatively charged by the negative source of potential connected to the voltage divider comprising resistors 89 and 91.

During the interval of time that tube 87 conducts, a positive pulse is developed across the cathode resistor 93. Each positive pulse is applied to the grid of tube 63, causing grid current to flow therein which charges capacitor 94. At the end of a positive pulse across resistor 93, the voltage across resistor 96 becomes negative and the capacitor 94 begins to discharge through resistor 96, which has a large resistance value. The R-C time constant of resistor 96 and capacitor 94 is chosen to be of the order of ten times the resting time between the pulses of a series of recurrent blocking oscillator pulses provided across resistor 93. Therefore, the capacitor 94 is only partially discharged during the time interval between pulses. During an uninterrupted pulse series across the resistor 93 the average voltage across resistor 96 is sufficiently negative to bias the grid of tube 63 well below cut-off. Thus, the plate current flow in tube 63 is substantially cut-off and the armature switch members 58 and 61 of relay 59 close to their normal positions.

The conducting period of tube 87 and the width of a pulse produced across the cathode resistor 93 thereof is determined primarily by the size of capacitor 92, the smaller the capacitor the shorter its charging time and the shorter the width of the pulses developed across resistor 93. Generally the amplitude of the pulses produced across resistor 93 are substantially constant regardless of changes in amplitude of the pulses at the grid of trigger tube 67.

When switch member 61 is closed as aforedescribed the output pulses at discriminator output 31, which are always of negative polarity over the frequency band of discriminator 19 as is seen from FIG. 3, are supplied to the grid of tube 66. The resulting positive output pulses at the plate of tube 66 are supplied to the grid of trigger tube 67 through the coupling capacitor 78. These positive pulses cause the trigger tube 67, blocking oscillator 68 and circuit 69 to maintain the tube 63 at a cut-off condition in the same manner that the positive pulses at the output of diode 64 caused such a condition. The positive pulses at the plate of tube 66 cannot reach the video amplifier 51 because they are blocked by diode 64.

Therefore, once the tube 63 is cut-off and the armature switch members 58 and 61 are closed by the first relay control circuit including diode 64, the tube 63 will remain cut-off for the remaining part of a substantially uninterrupted discriminator response by the second relay control circuit which includes tube 66.

As search of the local oscillator continues in the direction of the arrow in FIG. 2, lock-on of the local oscillator takes place at point L in region B at the desired intermediate frequency of 30 megacycles per second. Lock-on occurs when rising positive pulses of predetermined amplitude appear on lead 29 from discriminator network 19. Such pulses, when they reach the plate of search stopper diode 56 as previously described, cause the frequency of local oscillator 14 to be maintained at point L in FIG. 2.

After lock-on, as changing operating temperatures or other factors shift the absolute operating frequencies of the transmitter 11 or local oscillator 14, the intermediate frequency will tend to vary. A decreasing intermediate frequency, for instance, results in increasing positive pulses at the output 29 of the discriminator network 19 and an increasing negative voltage on the grid of search generator 15. This causes the output voltage from search generator 15 to become less negative, causing the frequency of local oscillator 14 to be decreased. A reverse situation obtains if the above variable factors cause the intermediate frequency to be raised. As a result, balance is maintained and the intermediate or difference frequency is substantially constant.

If for some reason the difference frequency should go to the right in FIG. 2 beyond region B, frequency search of the local oscillator will carry the difference frequency pulses to the right toward region C. This occurs because the discriminator 19 is not responsive between region B and C, and locking of the sweep generator 15 cannot occur. During this frequency traversal the blocking oscillator circuit 68 and circuit 69 are not operated because of the absence of any output from discriminator 19 either on lead 29 or on lead 31, and relay control tube 63 again conducts to open switch members 58 and 61.

In region C, signals are produced at the outputs 29 and 31 of discriminator 19, but they will not be able to cause the closure of switch members 58 and 61. This is evident because they are of the wrong polarity, after inversion by amplifier 51, to pass through the diode 64 of the first relay control circuit to drive the blocking oscillator 68 to cause tube 63 to be cut-off. Since switch member 61 is also open, the second relay control circuit including tube 66 is also inoperative. Hence, the switch member 58 is not closed in region C, and false lock on cannot there occur.

In region D of FIG. 2, the outputs at 29 and 31 from discriminator network 19 cause the first and second relay control circuits described above to close switch members 58 and 61 in the manner described when the output of discriminator network is in region A. However, the system will not lock because the negative pulses at the output 29 of the discriminator 19 in region D, after inversion by amplifier 51, are of the wrong polarity to pass through diode 52 or to operate the search stopper tube 56. Hence, the search action continues on beyond region D to the high frequency limit thereof.

At the end of the search cycle beyond region D, the voltage at the plate of sweep generator 15 abruptly returns to a value close to ground potential. This occurs in the same manner that the plate potential of the oscillator described on pages 328–330 in Sec. 7.13 of the aforementioned book entitled "Microwave Mixers" returns to $E_b$. The sudden voltage change is simultaneously applied to the repeller electrode of the local oscillator 14 and the grid of the tuner triode therein. The thermally tuned local oscillator 14 does not oscillate for any appreciable interval during the abrupt voltage change because of the inertia of the thermal tuning mechanism therein. Hence, no intermediate frequency signals are produced during such an interval. For that interval where the local oscillator 14 may oscillate, the intermediate frequency signals produced may or may not be within the intermediate frequency pass band to which the discriminator network is responsive. Intermediate frequency signals which may be in such a band, and which would control the search stopper diode 56, cannot affect the search generator because the plate thereof is cut off by the suppressor during search return, as is discussed at the bottom of page 329 and the top of page 330 of the aforementioned book on "Microwave Mixers."

Thus, a positive automatic frequency control system is provided, wherein a predetermined frequency difference between the local oscillator and the transmitted energy is maintained. If for some reason the system becomes unlocked, it is evident that the frequency of the local oscillator is thereupon automatically varied through a sweep cycle until it is restored to the frequency which, when heterodyned with the transmitted frequency, is at the required predetermined difference therefrom.

As many changes could be made in the aforedescribed construction, and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio receiver frequency control system for automatically maintaining a substantially constant intermediate frequency difference of predetermined value between the frequencies of local oscillator energy and carrier wave energy of a series of recurrent pulses, said control system comprising: intermediate frequency energy responsive means having first and second outputs for providing first and second predetermined waveforms of recurrent output pulses, respectively, in response to received intermediate frequency energy over a predetermined frequency range, the pulses of said second waveform being of constant polarity throughout said frequency range, said means including a frequency discriminator having a predetermined crossover frequency and a first output circuit comprising the first output of said energy responsive means for providing voltage output responses of opposite polarities through predetermined frequency bands on adjacent sides of said crossover frequency, one of said responses including said frequency difference of predetermined value, means including a mixer for receiving said local oscillator energy and said carrier wave energy for supplying recurrent intermediate frequency pulses to said intermediate frequency energy responsive means, scanning means for recurrently sweeping said local oscillator frequency through a wide frequency sweep range to change said intermediate frequency over a wide range of frequencies including said discriminator crossover frequency, control channel means responsive to energy derived from output voltage pulses of one polarity only at said first output circuit of said discriminator for arresting the frequency sweep action of said scanning means and regulating the local oscillator frequency therethrough to provide said substantially constant intermediate frequency difference, said control channel means including first switch means having a first position to provide coupling between said frequency discriminator and said scanning means, a relay for actuating said switch means, a relay control discharge device coupled to said relay, a source of potential coupled to said discharge device to provide current passage therethrough and through said relay to change the position of said switch means from its first position to a second position during said current passage through said discharge device so that said discriminator and scanning means are decoupled, first switch control means coupled to an electrode of said discharge device, said first switch control means being responsive to energy derived from a series of recurrent output pulses of polarity opposite said one polarity at said first output circuit of said discriminator to regulate the potential on said electrode of said discharge device to substantially cut-off the current passage therethrough so that said switch means is returned to its first position, and second switch control means coupled between said second output of said intermediate frequency energy responsive means and said electrode of said discharge device to maintain the cut-off potential on said electrode during an uninterrupted discriminator response after regulation of said potential by said first switch control means, said first and second switch control means including a resistor-capacitor coupling circuit having a resistance path coupled between said electrode of said discharge device and ground, said first and second switch control means further including a pulse driven monostable oscillator having an input circuit and an output common to said first and second switch control means, the input circuit of said oscillator being coupled to the first and second outputs of said intermediate frequency energy responsive means for providing a first series of recurrent output pulses in response to the predetermined recurrent pulses of polarity opposite said one polarity at said first output of said energy responsive means followed by a second series of recurrent output pulses in response to pulses at the second output of said energy responsive means, said resistor-capacitor circuit being connected between the output of said oscillator and a control grid of said discharge device for regulating the grid potential thereof for cutting off said discharge device in response to recurrent output pulses provided by said oscillator, the time constant of said resistor-capacitor coupling circuit being appreciably larger than the resting time between the pulses of the series of pulses provided at the output of said oscillator, whereby the frequency of said local oscillator is arrested and regulated through said control channel means by discriminator pulses of said one polarity only on one side of the frequency of said carrier wave energy.

2. A radio receiver frequency control system as set forth in claim 1, wherein said discriminator includes a second output circuit comprising the second output of said intermediate frequency energy responsive means for providing recurrent output voltage pulses of one polarity over the frequency bands of said discriminator and the crossover frequency thereof, second switch means ganged to said first switch means, said second switch control means being coupled to said second discriminator output circuit through said second switch means.

3. A radio receiver frequency control system as set forth in claim 1, wherein said first switch control means include a diode coupled between the first output circuit of said discriminator and the input of said oscillator.

4. A radio receiver frequency control system as set forth in claim 3, wherein said discriminator includes a second output circuit comprising the second output of said intermediate frequency energy responsive means, said second switch control means including a second switch and pulse amplifier means coupled between the input of said trigger tube and said second output circuit of said discriminator for supplying pulses of the same polarity to the input of said trigger tube as pulses supplied through said first switch control means, said second switch means decoupling the second output of said discriminator from said trigger tube during the frequency sweep of said local oscillator, said second switch means being ganged to said first switch means to complete the coupling between said discriminator and said trigger tube upon actuation of said first switch by the response of said first switch control means.

5. In combination, an automatic frequency control loop including an intermediate frequency pulse energy responsive circuit having first and second outputs, said circuit being responsive to recurrent pulses of intermediate frequency energy for providing pulses at said first output which are of opposite polarity on opposite sides of a predetermined intermediate frequency within said frequency band while providing a null at said predetermined frequency, said energy responsive circuit being further responsive to pulses of intermediate frequency for providing pulses at said second output which are of one polarity and of substantially constant magnitude over said frequency band, a switch coupled to said first output for opening and closing said automatic frequency control loop in response to first and second operative states, respectively, of said switch, means including a relay coil in series with a grid-controlled discharge tube for operating said switch in its first state in response to current flow through said tube and in its second state upon cut-off of current flow through said tube, means including a pulse driven oscillator connected between said first output of said intermediate frequency energy responsive circuit and the grid of said discharge tube for biasing said tube below cut-off in response to pulses of one polarity at said first output, and means including a switch connected between said second output of said intermediate frequency energy responsive circuit and said pulse driven oscillator, said further switch having first and second operative states for respectively decoupling and coupling said second output to said pulse driven oscillator, said switches being ganged for concurrent operation in their first operative states and their second operative states, said last-named means being responsive to the pulses at said second output of said energy responsive circuit for driving said oscillator and biasing said discharge tube below cut-off, with said further switch in its second operative state.

6. The combination as set forth in claim 5, wherein a unidirectional current device is provided in the connection of said pulse driven oscillator to said first output of said intermediate frequency energy responsive circuit.

7. The combination as set forth in claim 6, wherein a pulse amplifier is provided in the connection between said pulse driven oscillator and said second output of said intermediate frequency energy responsive circuit, the output of said amplifier being connected to a point between said unidirectional current device and said pulse driven oscillator.

8. The combination as set forth in claim 7, wherein said oscillator comprises a blocking oscillator driven by a trigger tube whose input is connected to said point between said unidirectional current device and the output of said amplifier, the output of said trigger tube being connected to the input of said blocking oscillator.

References Cited by the Examiner

UNITED STATES PATENTS

| | | | |
|---|---|---|---|
| 2,434,294 | 1/48 | Ginzton | 325—420 XR |
| 2,555,175 | 5/51 | Whitford | 331—4 |
| 2,562,304 | 7/51 | Durand et al. | 325—420 |

DAVID G. REDINBAUGH, *Primary Examiner.*

NORMAN H. EVANS, CHESTER L. JUSTUS, *Examiners.*